(12) United States Patent
Wang et al.

(10) Patent No.: US 9,179,396 B2
(45) Date of Patent: Nov. 3, 2015

(54) ALMOST-BLANK SUBFRAME CONFIGURATION DETECTION IN HETEROGENEOUS NETWORKS

(75) Inventors: Jianfeng Wang, Beijing (CN); Matthias Kamuf, Waghäusel (DE); Shaohua Li, Beijing (CN); Fredrik Nordström, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 529 days.

(21) Appl. No.: 13/384,440

(22) PCT Filed: Nov. 9, 2011

(86) PCT No.: PCT/CN2011/081993
§ 371 (c)(1),
(2), (4) Date: Mar. 15, 2012

(87) PCT Pub. No.: WO2013/067694
PCT Pub. Date: May 16, 2013

(65) Prior Publication Data
US 2013/0114435 A1    May 9, 2013

(51) Int. Cl.
*H04W 48/16*    (2009.01)
*H04L 5/00*    (2006.01)
(Continued)

(52) U.S. Cl.
CPC .............. *H04W 48/16* (2013.01); *H04B 7/04* (2013.01); *H04L 27/2602* (2013.01);
(Continued)

(58) Field of Classification Search
CPC .............. H04W 16/14; H04W 72/044; H04W 72/0473; H04W 72/06; H04W 24/00; H04W 24/02; H04W 16/32; H04W 52/244; H04W 52/241; H04W 52/246; H04W 52/00; H04W 52/04; H04W 52/16; H04W 52/18; H04W 52/30; H04W 52/32; H04W 52/34; H04W 52/248; H04W 52/322; H04W 52/327; H04L 43/50; H04L 43/0852; H04L 43/08; H04L 9/003; H04L 9/0612; H04L 25/024; H04L 25/0202
USPC .................... 370/252, 279; 375/267, 295, 340
See application file for complete search history.

(56) References Cited

U.S. PATENT DOCUMENTS

2010/0272004 A1* 10/2010 Maeda et al. .................. 370/312
2011/0103286 A1*  5/2011 Montojo et al. ............... 370/312
(Continued)

FOREIGN PATENT DOCUMENTS

CN    101637048 A    1/2010
CN    101931862 A   12/2010
(Continued)

*Primary Examiner* — Alpus H Hsu
*Assistant Examiner* — Dharmesh Patel
(74) *Attorney, Agent, or Firm* — Coats & Bennett, P.L.L.C.

(57) ABSTRACT

A method for detecting an Almost-Blank Subframe (ABS) configuration for an interfering macro cell of a heterogeneous network is implemented in a wireless terminal. For one or more resource blocks in a received signal, a first power metric is calculated as a function of channel response estimates determined for predicted cell-specific (or common) reference signal (CRS) resource element locations in a plurality of symbols. For the one or more resource blocks in the received signal, a second power metric is calculated as a function of channel response estimates determined for the predicted CRS resource element locations in a single one of the plurality of symbols. A difference between the first and second power metrics is compared to a threshold, and responsive to the comparison a determination is made as to whether the macro cell is operating in a Multicast and Broadcast Single Frequency Network (MBSFN) mode or a non-MBSFN mode.

16 Claims, 11 Drawing Sheets

(51) Int. Cl.

| | | |
|---|---|---|
| *H04L 27/26* | (2006.01) | |
| *H04W 84/04* | (2009.01) | |
| *H04J 11/00* | (2006.01) | |
| *H04W 24/08* | (2009.01) | |
| *H04B 7/04* | (2006.01) | |
| *H04W 52/00* | (2009.01) | |
| *H04W 72/00* | (2009.01) | |

(52) U.S. Cl.
CPC ............. *H04W 52/00* (2013.01); *H04W 72/00* (2013.01); *H04J 11/005* (2013.01); *H04L 5/005* (2013.01); *H04L 5/0023* (2013.01); *H04L 5/0035* (2013.01); *H04W 24/08* (2013.01); *H04W 84/045* (2013.01)

(56) References Cited

U.S. PATENT DOCUMENTS

| | | | |
|---|---|---|---|
| 2011/0110442 A1* | 5/2011 | Wu et al. | 375/260 |
| 2011/0141987 A1* | 6/2011 | Nam et al. | 370/329 |
| 2011/0319025 A1* | 12/2011 | Siomina et al. | 455/63.1 |
| 2012/0057480 A1* | 3/2012 | Yoo et al. | 370/252 |
| 2012/0094691 A1 | 4/2012 | Chen et al. | |
| 2012/0113961 A1* | 5/2012 | Krishnamurthy | 370/332 |
| 2012/0172041 A1* | 7/2012 | Krishnamurthy et al. | 455/436 |
| 2012/0275371 A1 | 11/2012 | Somasundaram et al. | |
| 2014/0086095 A1 | 3/2014 | Jung et al. | |

FOREIGN PATENT DOCUMENTS

| | | |
|---|---|---|
| CN | 102026209 A | 4/2011 |
| CN | 102088434 A | 6/2011 |
| WO | 2011122833 A2 | 10/2011 |
| WO | WO2012062178 A1 * | 5/2012 |
| WO | 2013019046 A2 | 2/2013 |

* cited by examiner (A) SCENARIO 1: NON-COLLIDING CRS REs WITH NON-MBSFN ABS CONFIGURATION (B) SCENARIO 2: NON-COLLIDING CRS REs WITH MBSFN ABS CONFIGURATION (C) SCENARIO 3: COLLIDING CRS REs WITH NON-MBSFN ABS CONFIGURATION (D) SCENARIO 4: COLLIDING CRS REs WITH MBSFN ABS CONFIGURATION

ALMOST-BLANK SUBFRAME CONFIGURATION DETECTION IN HETEROGENEOUS NETWORKS

TECHNICAL FIELD

The present invention relates generally to heterogeneous wireless communication networks, and more particularly relates to techniques for determining an Almost-Blank Subframe (ABS) configuration of a macro cell in a heterogeneous network.

BACKGROUND

The $3^{rd}$ Generation Partnership Project (3GPP) is continuing development of the fourth-generation wireless network technologies known as Long-Term Evolution (LTE). In heterogeneous networks, a mixture of cells of different sizes and overlapping coverage areas are deployed. Improved support for heterogeneous network operations is part of the ongoing specification of 3GPP LTE Release-10, and improved support and further improvements in the context of new features for heterogeneous network operations are being discussed for Release-11 and beyond.

One example of such a deployment is seen in the heterogeneous network 100 of FIG. 1, where several low-power cells 120 (e.g. picocells), each with a respective coverage area 150, are deployed within the larger coverage area 140 of a macro cell 110, for supporting wireless communication with one or more wireless terminals 160. The macro cell 110 corresponds to a macro-base station, or node B, ("MeNB"), while the picocells 120 correspond to pico base stations ("PeNBs"). The network 100 of FIG. 1 is suggestive of a wide-area wireless network deployment. Some additional examples of low-power nodes, also referred to as "points," in heterogeneous networks, include home base stations and relays. Although picocells are discussed throughout this application, it is understood that these are only a non-limiting example of the type of low-power cell that can be used in a heterogeneous network.

One aim of deploying low-power nodes such as picocells 120 within the macro coverage area 140 is to improve system capacity, by means of cell-splitting gains. In addition to improving overall system capacity, this approach also allows users to be provided with a wide-area experience of very-high-speed data access, throughout the network. Heterogeneous deployments are particularly effective for covering traffic hotspots, i.e., small geographical areas with high user densities. These areas can be served by picocells, for example, as an alternative deployment to a denser macro network.

Orthogonal Frequency-Division Multiplexing (OFDM) technology is a key underlying component of LTE. As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency-Division Multiple Access (OFDMA) for the downlink transmissions from the base station to a wireless terminal, and has specified Single Carrier Frequency-Division Multiple Access (SC-FDMA) for uplink transmissions from a wireless terminal to a base station. Both multiple access schemes permit the available sub-carriers to be allocated among several users.

SC-FDMA technology employs specially formed OFDM signals, and is therefore often called "pre-coded OFDM" or Discrete-Fourier-Transform (DFT)-spread OFDM. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a wireless terminal's limited battery resources. (SC-FDMA is described more fully in Myung, et al., "Single Carrier FDMA for Uplink Wireless Transmission," *IEEE Vehicular Technology Magazine*, vol. 1, no. 3, September 2006, pp. 30-38.)

The basic LTE physical resource can be seen as a time-frequency grid. This concept is illustrated in FIG. 2, which shows a number of so-called "subcarriers" in the frequency domain, at a frequency spacing of $\Delta f$, divided into OFDM symbol intervals in the time domain. Each individual element of the resource grid 210 is called a resource element (RE) 220, and corresponds to one subcarrier during one OFDM symbol interval, on a given antenna port. One of the unique aspects of OFDM is that each symbol 230 begins with a cyclic prefix 240, which is essentially a reproduction of the last portion of the symbol 230 affixed to the beginning. This feature minimizes problems from multipath, over a wide range of radio signal environments. Although reference numeral 230 points to a single RE of an OFDM symbol, it is understood that reference numeral 230 refers to the entire OFDM symbol and not just that single RE.

In the time domain, LTE downlink transmissions are organized into radio frames of ten milliseconds each, each radio frame consisting of ten equally-sized subframes of one millisecond duration. This is illustrated in FIG. 3, where an LTE signal 310 includes several frames 320, each of which is divided into ten subframes 330. Not shown in FIG. 3 is that each subframe 330 is further divided into two slots, each of which is 0.5 milliseconds in duration.

LTE link resources are organized into "resource blocks," often defined as time-frequency blocks with a duration of 0.5 milliseconds, corresponding to one slot, and encompassing a bandwidth of 180 kHz, corresponding to 12 contiguous subcarriers with a spacing of 15 kHz. Resource blocks are numbered in the frequency domain, starting with 0 from one end of the system bandwidth. Two time-consecutive resource blocks represent a resource block pair, and correspond to the time interval upon which scheduling operates. Of course, the exact definition of a resource block may vary between LTE and similar systems, and the inventive methods and apparatus described herein are not limited to the numbers used herein. Thus, although the term "resource block" is used below to refer to a block of resources covering 12 consecutive subcarriers with a duration of 1 millisecond (a 12×14 resource block) instead of a duration of 0.5 milliseconds (a 12×7 resource block), it is understood that this is only a non-limiting example.

In general, resource blocks may be dynamically assigned to wireless terminals, and may be assigned independently for the uplink and the downlink. Depending on a wireless terminal's data throughput needs, the system resources allocated to it may be increased by allocating resource blocks across several sub-frames, or across several frequency blocks, or both. Thus, the instantaneous bandwidth allocated to a wireless terminal in a scheduling process may be dynamically adapted to respond to changing conditions.

For scheduling of downlink data, the base station transmits control information in each subframe. This control information identifies the wireless terminals to which data is targeted and the resource blocks, in the current downlink subframe, that are carrying the data for each terminal. The first one, two, three, or four OFDM symbols in each subframe are used to carry this control signaling, and may be referred to as a "control region." In FIG. 4, a downlink subframe 410 is shown, with three OFDM symbols allocated to control region 420. The control region 420 consists primarily of control data resource elements (REs) 434, but also includes a number of cell-specific reference signal (CRS) REs 432, used by the receiving station to measure channel conditions. These reference signal REs 432 are interspersed at predetermined locations throughout the control region 420 and among the data REs 436 in the data portion 430 of the subframe 410, and correspond to a cell-specific (or common) reference signal (CRS).

Transmissions in LTE are dynamically scheduled in each subframe, where the base station transmits downlink assignments/uplink grants to certain wireless terminals (also known as user equipment, or UEs, in 3GPP terminology) via the physical downlink control channel (PDCCH). The PDCCHs are transmitted in the control region 420 of the OFDM signal, i.e., in the first OFDM symbol(s) of each subframe, and span all or almost all of the entire system bandwidth. A UE that has decoded a downlink assignment, carried by a PDCCH, knows which resource elements in the subframe that contain data aimed for that particular UE. Similarly, upon receiving an uplink grant, the UE knows which time-frequency resources it should transmit upon. In the LTE downlink, data is carried by the physical downlink shared channel (PDSCH) and in the uplink the corresponding channel is referred to as the physical uplink shared channel (PUSCH).

LTE also employs multiple modulation formats, including at least QPSK, 16-QAM, and 64-QAM, as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells. In addition, LTE uses a hybrid-ARQ (HARQ) error correction protocol where, after receiving downlink data in a subframe, the terminal attempts to decode it and reports to the base station whether the decoding was successful (ACK) or not (NACK). In the event of an unsuccessful decoding attempt, the base station can retransmit the erroneous data.

LTE offers the possibility of transmitting Multicast and Broadcast over a Single Frequency Network (MBSFN), in which a time-synchronized common waveform is transmitted from multiple cells for a given duration. MBSFN transmission can be highly efficient, allowing for over-the-air combining of multi-cell transmissions in the UE while appearing to the UE as a transmission from a single large cell. Use of MBSFN can improve received signal strength, and can eliminate inter-cell interference.

SUMMARY

In heterogeneous networks, interference in low-power cells is dominated by interference from macro cells. Some macro cells use Almost Blank Subframes (ABS), which omit control and data resource elements, and include only cell-specific (or common) reference signal (CRS) resource elements (REs), to minimize their transmissions to wireless terminals supported by a low-power cell. As will be described below, blind detection methods are disclosed that analyze the interference from an ABS to determine if a macro cell is operating in a MBSFN or non-MBSFN mode.

In one embodiment, a method for detecting an ABS configuration for an interfering macro cell of a heterogeneous network is implemented in a wireless terminal. For one or more resource blocks in a received signal, a first power metric is calculated as a function of channel response estimates determined for predicted CRS RE locations in a plurality of symbols of the ABS. For the one or more resource blocks in the received signal, a second power metric is calculated as a function of channel response estimates determined for the predicted CRS RE locations in a single one of the plurality of symbols. A difference between the first and second power metrics is compared to a threshold, and responsive to the comparison a determination is made as to whether the macro cell is operating in a MBSFN mode or a non-MBSFN mode. In one example, the MBSFN mode corresponds to the difference being greater than or equal to the threshold, and the non-MBSFN mode corresponds to the difference being less than the threshold.

The determination of whether the macro cell is operating in the MBSFN mode may be used, along with a determination of whether the CRS REs from the interfering macro cell and a low-power cell within the macro cell are colliding or non-colliding, to determine at least one of a demodulation algorithm or a channel feedback algorithm for the wireless terminal.

In a corresponding apparatus embodiment, a wireless terminal for use in a heterogeneous wireless communication network includes one or more transceivers operative to transmit messages to and receive messages from an interfering macro cell and a low-power cell in the heterogeneous wireless communication network. A processing circuit is operatively associated with the one or more transceivers and includes a first power metric calculator, a second power metric calculator, a power metric comparer, and a macro cell mode determiner.

The first power metric calculator is configured to calculate, for one or more resource blocks in a received signal, a first power metric as a function of channel response estimates determined for predicted CRS RE locations in a plurality of symbols. The second power metric calculator is configured to calculate, for the one or more resource blocks in the received signal, a second power metric as a function of a channel response estimates determined for the predicted CRS RE locations in a single one of the plurality of symbols. The power metric comparer is configured to compare a difference between the first and second power metrics to a threshold. The macro cell mode determiner is configured to determine whether the macro cell is operating in a MBSFN mode or a non-MBSFN mode responsive to the comparison, with the MBSFN mode corresponding to the difference being greater than or equal to the threshold, and the non-MBSFN mode corresponding to the difference being less than the threshold.

The processing circuit of the wireless terminal may also include a collision detector configured to determine whether CRS REs from the interfering macro cell and a low-power cell within the macro cell are colliding or non-colliding, responsive to a received cell identifier from each of the macro cell and the low-power cell. An algorithm selector of the processing circuit may be configured to use the output of the macro cell mode determiner and the collision detector to determine at least one of a demodulation algorithm or a channel feedback algorithm for use in processing signals received from the low-power cell.

Of course, the present invention is not limited to the features and advantages summarized above. Indeed, those skilled in the art will recognize additional features and advantages of the present invention upon reading the following detailed description and viewing the attached drawings.

DETAILED DESCRIPTION

Figure 1:
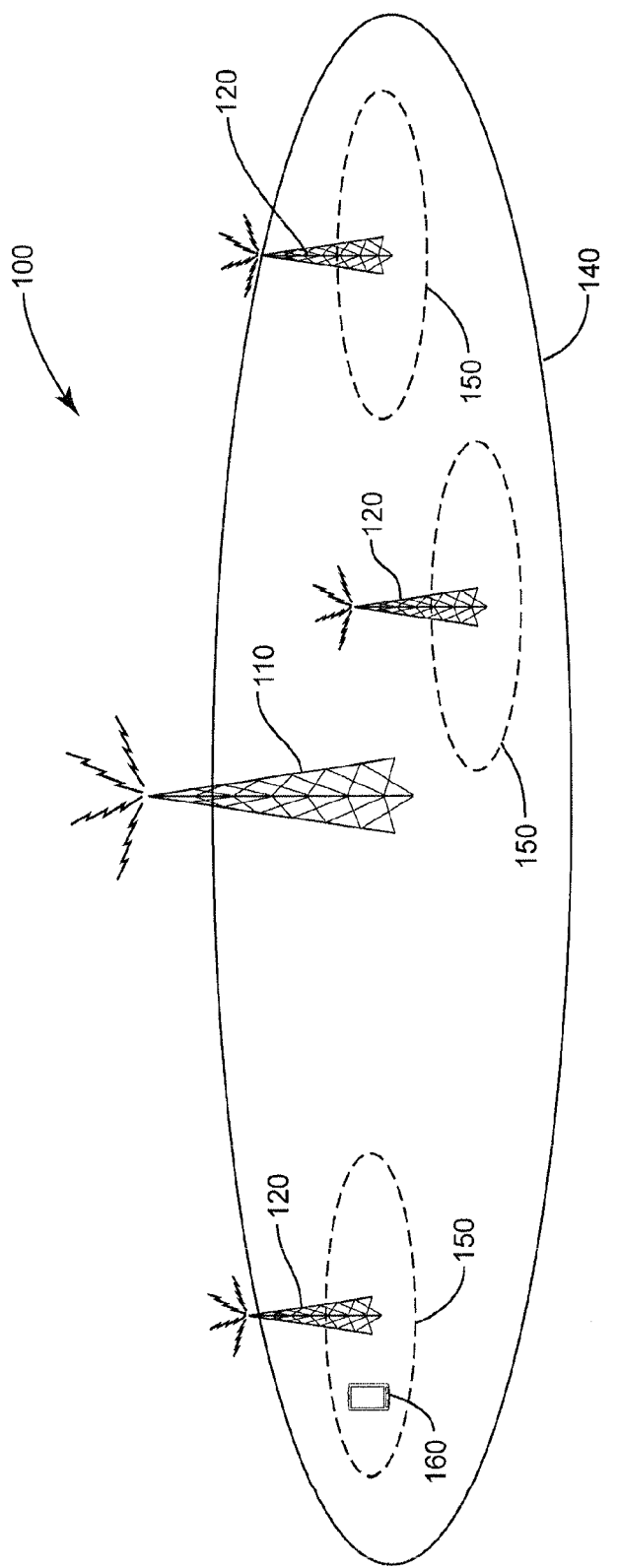
FIG. 1 illustrates several picocells overlaid by a macro cell in a heterogeneous network.
Figure 2:
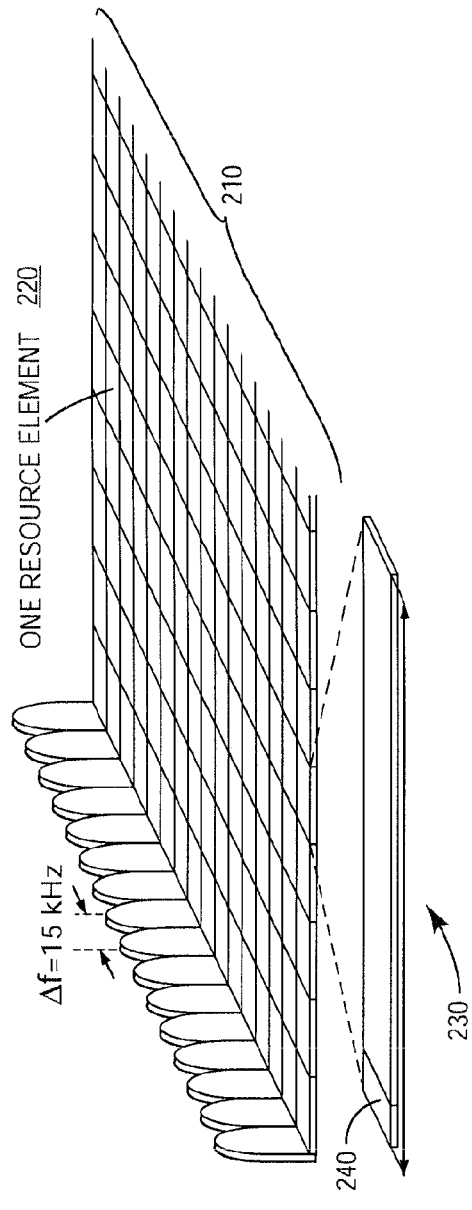
FIG. 2 illustrates features of the OFDM time-frequency resource grid.
Figure 3:
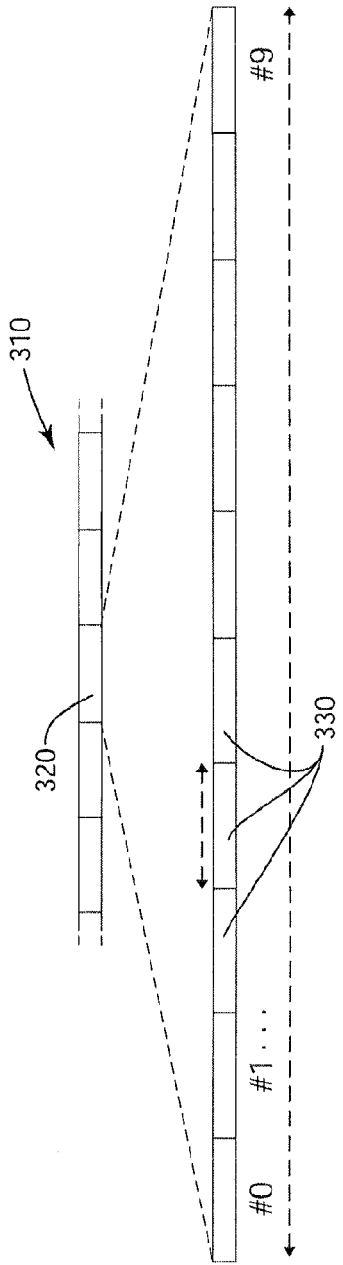
FIG. 3 illustrates the time-domain structure of an LTE signal.

Various embodiments of the present invention are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced (see, e.g., 3GPP TS 36.211 v10.3.0) is used throughout this document to exemplify the invention, this should not be seen as limiting the scope of the invention to only these systems. Other wireless systems including or adapted to include heterogeneous cell deployments may also benefit from exploiting the ideas covered herein.

Note also that the term "wireless terminal" as used in this application broadly refers to a device capable of wireless communicating with both a macro cell and a low-power cell. Thus, as described above, the wireless terminal may correspond to a UE in an LTE network, a non-LTE mobile terminal, or even a stationary wireless communication device such as a Machine-Type Communication (MTC) device.

Demodulation of transmitted data generally requires estimation of the radio channel over which the data is received. In LTE systems, this is done using transmitted reference symbols (RS), i.e., transmitted symbols having values that are already known to the receiver. In LTE, these reference symbols may correspond to the cell-specific CRS REs that are transmitted in all downlink subframes. In addition to assisting with downlink channel estimation, the CRS REs are also used for mobility measurements performed by the wireless terminals.

The CRS REs are generally intended for use by all the wireless terminals in the coverage area. To support improved channel estimation, especially when multiple-input multiple-output (MIMO) transmission techniques are used, LTE also supports UE-specific RS, which are targeted to individual wireless terminals and are intended specifically for channel estimation for demodulation purposes.

Figure 4:
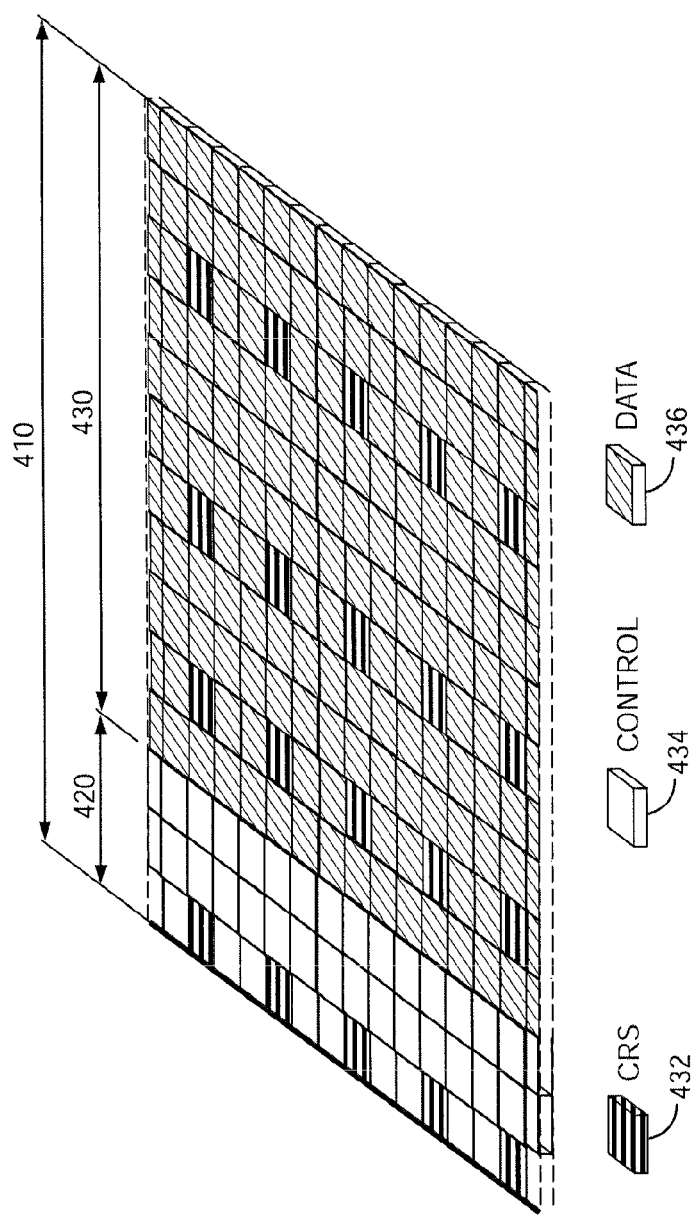
FIG. 4 illustrates features of an LTE downlink subframe.

FIG. 4 illustrates how the mapping of physical control/data channels and signals can be done on resource elements within a downlink subframe 410. In the pictured example, the PDCCHs occupy only the first out of the three possible OFDM symbols that make up the control region 420 (i.e. the leftmost OFDM symbol in FIG. 4), so in this particular case the mapping of data can begin at the second OFDM symbol. Since the CRS are common to all UEs in the cell, the transmission of CRS cannot be easily adapted to suit the needs of a particular UE. This is in contrast to the UE-specific RS (not shown in FIG. 4), by means of which each UE can have RS of its own placed in the data region 430 of FIG. 4, as part of the PDSCH.

The length (one, two, or three symbols) of the control region 420 that is used to carry PDCCH can vary on a subframe-to-subframe basis, and is signaled to the wireless terminal in the Physical Control Format Indicator CHannel (PCFICH). The PCFICH is transmitted within the control region 420, at locations known by terminals. Once a wireless terminal has decoded the PCFICH, it then knows the size of the control region 420 and also knows the OFDM symbol in which data transmission starts. Also transmitted in the control region 420 is the Physical Hybrid-ARQ Indicator Channel. This channel carries ACK/NACK responses to a terminal, to inform the wireless terminal whether the uplink data transmission in a previous subframe was successfully decoded by the base station.

FIG. 5 illustrates a downlink subframe 510 from a low-power cell 120 (e.g. a picocell). Like the subframe 410, the subframe 510 includes a control region 520, and a data region 530. The control region 520 is used to transmit control resource elements 534 (e.g. via the PDCCH, PCFICH, and/or Physical Hybrid ARQ Indicator CHannel or "PHICH"). The data region 530 is used to transmit data resource elements 536 (e.g. via the PDSCH). Both the control region 520 and the data region 530 are used to transmit cell-specific CRS REs 532.

Figure 5A:
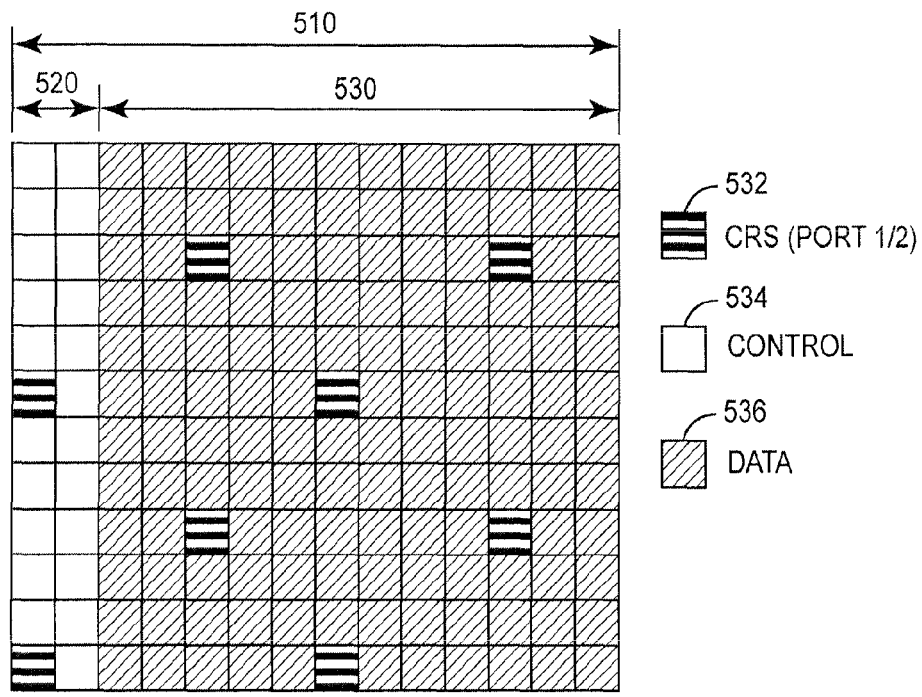
FIGS. 5a-b illustrate example subframes received from a low-power cell within a macro cell.
Figure 5B:
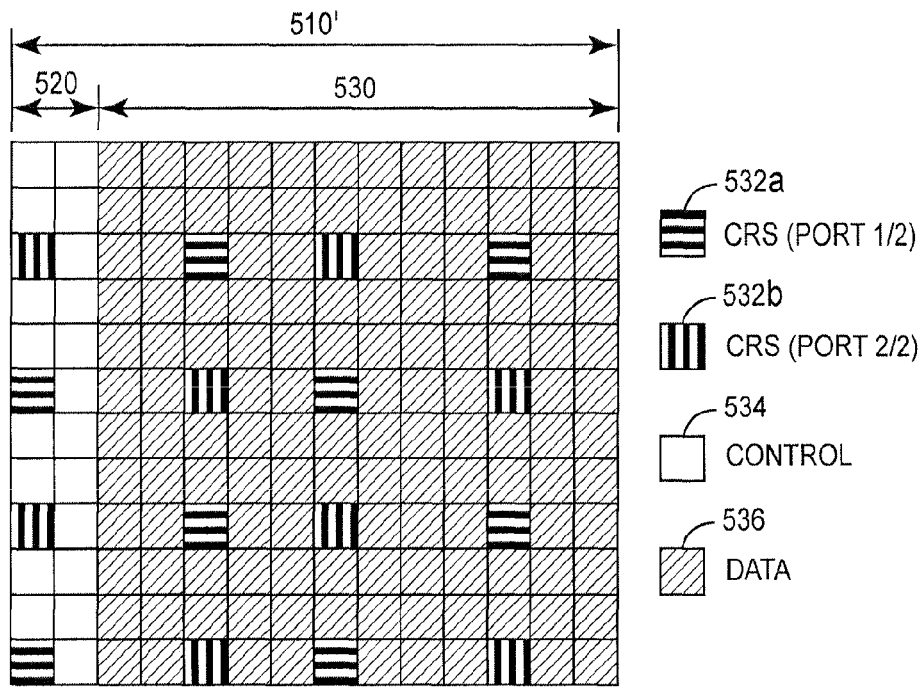

In LTE networks, for example, 1, 2 or 4 antenna ports may be used by a transmitting cell. If the macro cell 110 and low-power cell 120 utilize multiple antenna ports, certain ones of the CRS REs may be used for each port. For example, FIG. 5a illustrates a subframe 510 in which one port is used, such that all CRS REs 532 apply to the single port. FIG. 5b, however, illustrates a subframe 510' cells utilizing a two port configuration. In the subframe 510', half of the CRS REs 532a correspond to a first of the two ports, and the other half of the CRS REs 532b correspond to a second of the two ports. Of course, other quantities of ports could also be used.

In heterogeneous networks 100, interference in picocells 120 is dominated by interference from macro cells 110. Some macro cells may minimize their transmissions to wireless terminals supported by a picocell by transmitting reference symbols to those wireless terminals using an Almost Blank Subframe (ABS). An ABS omits control and data elements that would otherwise be included in a downlink subframe, and includes only the CRS REs 432 that are common to both ABS and non-ABS transmissions.

Whether the macro cell 110 is operating a MBSFN mode, and also whether the CRS REs of the macro cell and a low-power cell within the macro cell are colliding, can affect the interference experienced by a wireless terminal. As will be described below, the interference from an ABS may be analyzed to determine if the interfering macro cell is operating in a MBSFN or a non-MBSFN mode.

FIGS. 6a-d illustrate a plurality of example macro cell ABS subframes, each ABS including one resource block corresponding to fourteen OFDM symbols, and including only CRS REs 670 and blanked REs 680. The blanked REs 680 are empty and without any content.

Figure 6A:
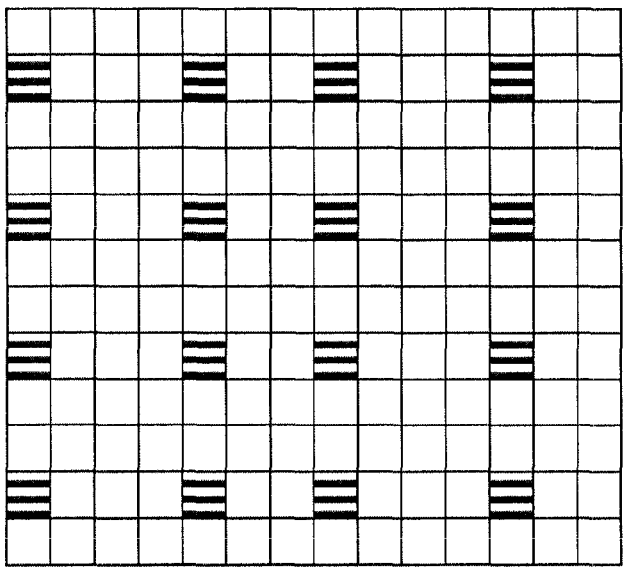
FIGS. 6a-d illustrate a plurality of example macro cell ABS subframes.

Referring to FIG. 6a, the ABS 610 includes CRS REs 670 in the first, fifth, eighth, and twelfth OFDM symbols of the ABS 610, indicating that the macro cell 110 transmitting the ABS 610 is operating in a non-MBSFN mode. Additionally, within each OFDM symbol, the CRS REs 670 are offset from the CRS REs 532 of the low-power downlink subframe 510 (see FIGS. 5a-b), indicating that the CRS REs 670 of the ABS 610 are non-colliding with respect to the CRS REs 532 of the subframe 510.

Figure 6B:
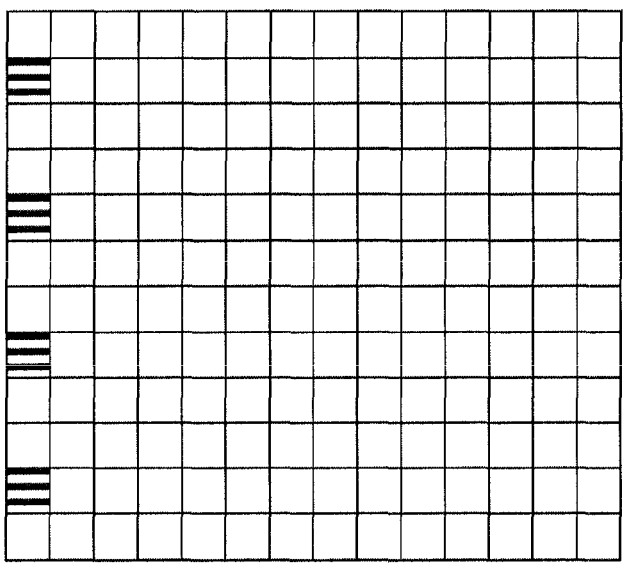

Referring to FIG. 6b, the ABS 620 includes CRS REs 670 only in a single OFDM symbol, indicating that the macro cell 110 transmitting the ABS 620 is operating in the MBSFN mode. As with the ABS 610, the CRS REs 670 are offset from the CRS REs 532 of the downlink subframe 510 (see FIG. 5), indicating that the CRS REs 670 of the ABS 610 are non-colliding with respect to CRS REs 532 of the subframe 510.

Figure 6C:
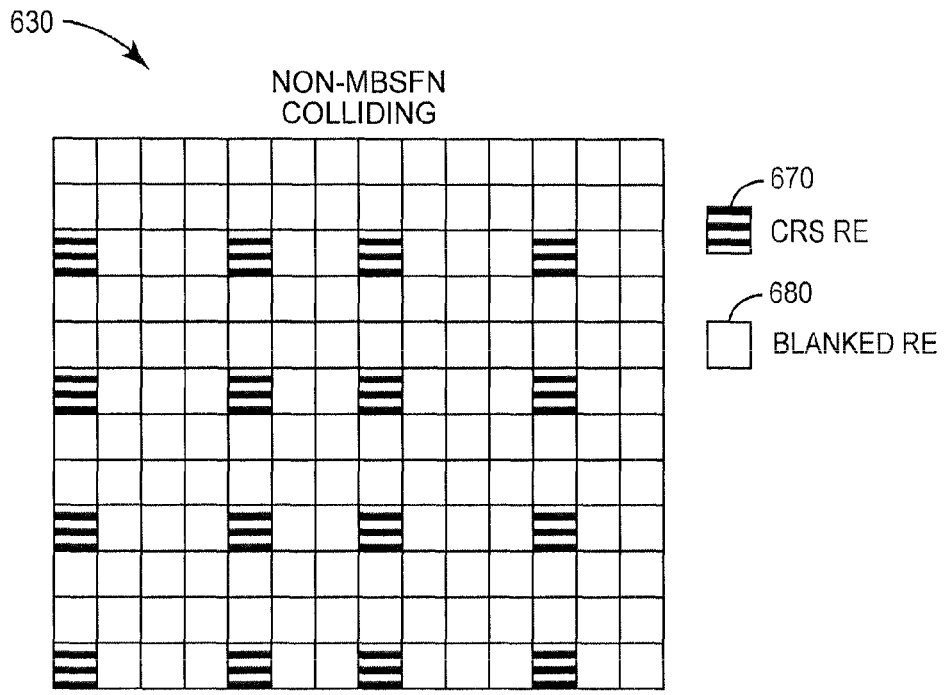
Figure 6D:
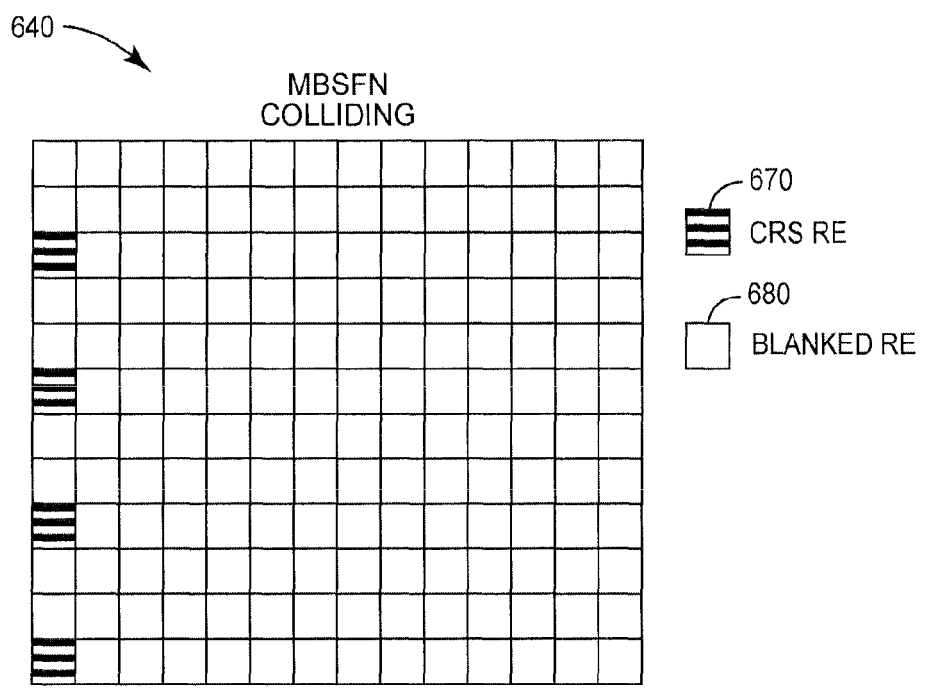

Referring to FIGS. 6c and 6d, the CRS REs 670 of each illustrated ABS 630, 640 are aligned with the CRS REs 532 of the downlink subframe 510 (see FIG. 5), indicating that the ABS 630, and the ABS 640 are colliding with the downlink subframe 510. Regarding the ABS 630 specifically, because the CRS REs 670 span across multiple OFDM symbols, the macro cell 110 transmitting the ABS 630 is operating in the non-MBSFN mode. Regarding the ABS 640 specifically, because the CRS REs 670 span across only a single OFDM symbol, the macro cell 110 transmitting the ABS 640 is operating in the MBSFN mode.

Each of these configurations exhibits different interference characteristics. Thus, each configuration corresponds to a different optimal demodulation process and/or interference processing approach. For example, if a macro cell is transmitting the ABS 610 of FIG. 6a (non-MBSFN/non-colliding CRS REs), the CRS REs 532 of the picocell are clean without any interference. However, some of the data REs 536 (sent via the PDSCH) may experience severe interference by the CRS REs 670 of macro cells. Thus, it may be desirable for a wireless terminal to compensate or puncture on the data REs 536 to improve demodulation performance. Furthermore, it may be desirable for the wireless terminal to adjust channel quality measurements by taking such interference into account to improve link adaptation performance.

If a macro cell is transmitting the ABS 620 of FIG. 6b (MBSFN/non-colliding CRS REs), the CRS REs 532 of the low-power are clean without any interference. However, some of the control REs 534 (sent via the PDCCH) experience interference because of the CRS REs 670 of the macro cell. In this scenario, it may be desirable to process the polluted REs (i.e. the REs of the control region 520 of subframe 510 which are experiencing collisions) in a special way, such as setting corresponding soft values to zero.

If a macro cell is transmitting the ABS 630 of FIG. 6c (non-MBSFN/colliding CRS REs), the CRS REs 670 interfere with all of the CRS REs 532 of the downlink subframe 510. However, in this scenario the data REs 536 are totally clean without any interference. In such a scenario, CRS cancellation algorithms can be implemented to improve the accuracy of channel estimation. Furthermore, when calculating Channel Quality Indicator (CQI)/Precoding Matrix Indicator (PMI)/Rank Indicator (RI), it may be desirable to compensate for the power offset between the CRS REs and PDSCH data REs 536 to improve link adaptation performance.

If a macro cell is transmitting the ABS 640 of FIG. 6d (MBSFN/colliding CRS REs), the CRS REs 532 in the data region 530 of the subframe 510 are clean, but the CRS REs 670 of the ABS 640 interfere with the CRS REs 532 in the control region 520, which results in different interference level for the CRS REs 532. In such a scenario, it would be desirable for control channel demodulation to estimate the radio channel from the CRS REs 532 in the control region 520, and for data channel demodulation (e.g. the PDSCH) it would be desirable to estimate the radio channel from the CRS REs 532 in the data region 530. Furthermore, it may be desirable to calculate the CQI/PMI/RI from the radio channel measured from the CRS REs 532 in the data region 530.

Although the example almost blank subframes 610-640 (see FIGS. 6a-b) and the low-power cell subframe 510 (see FIG. 5a) are illustrated separately, it is understood that these subframes will be overlayed on top of each other when received at a wireless terminal, with the ABS 610-640 representing interference from the macro cell 110. Thus, the control region 520 of the subframe 510 also refers to the same region of each ABS of FIGS. 6a-d. Similarly, the data region 530 of the subframe 510 also refers to the same region of each ABS of FIGS. 6a-d.

Methods for detecting both the macro cell operating mode (MBSFN/non-MBSFN) and CRS RE configuration (colliding or non-colliding) in a heterogeneous network are discussed below in detail, which methods enable a wireless terminal to optimize demodulation and/or interference processing based on this information. A wireless terminal 900 configured to implement those methods is also disclosed (see FIG. 11).

The ABS detection methods described below constitute "blind detection" methods, in that they may be performed prior to traditional receiver procedures such as CQI/PMI/RI calculation, channel estimation, and demodulation. These blind ABS detections may be based on a difference in Reference Signal Received Power (RSRP) of the CRS REs between the control region 520 and data region 530. Additionally, by using a cell ID of the macro cell 110 and the low-power cell 120, a determination can be made as to whether the CRS REs of the ABS and downlink subframe 510 are colliding or non-colliding.

Figure 7:
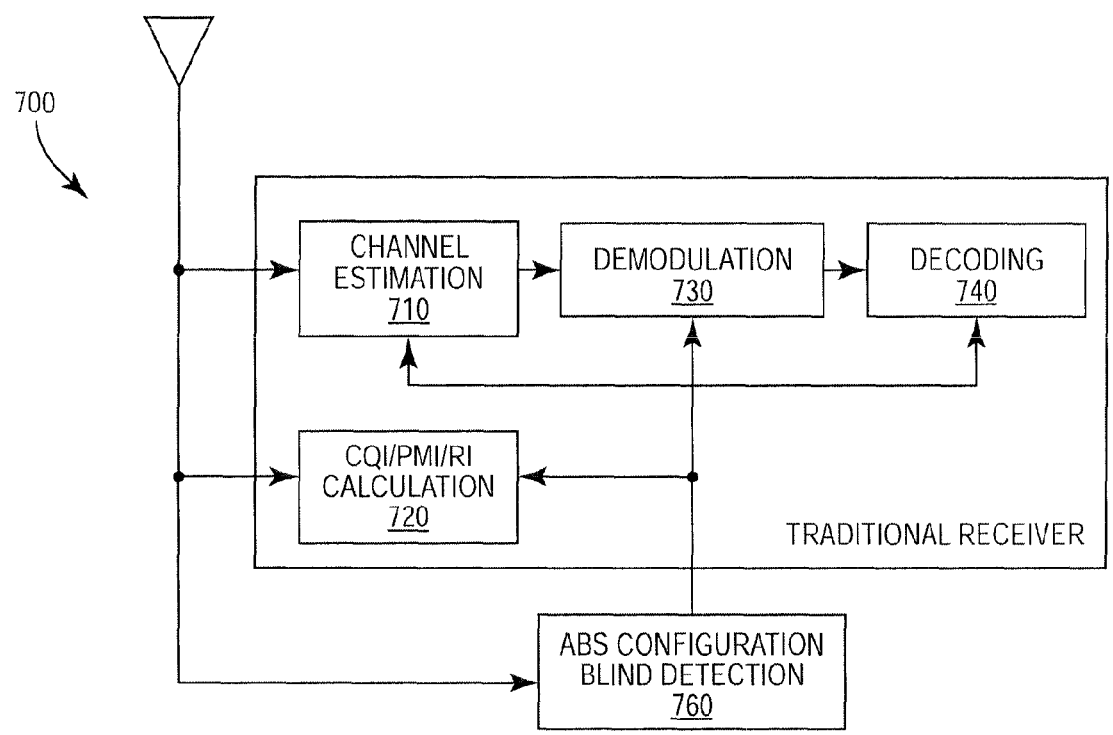
FIG. 7 illustrates how ABS detection can be used in connection with a traditional receiver.

Referring to FIG. 7, a signal processing block diagram 700 is shown, which utilizes channel estimation 710, CQI/PMI/RI calculation 720, demodulation 730, and decoding 740. As shown in FIG. 7, and as will be discussed below in greater detail, the inclusion of ABS configuration blind detection 760 can improve both CQI/PMI/RI calculation 720 and demodulation 730.

Figure 8:
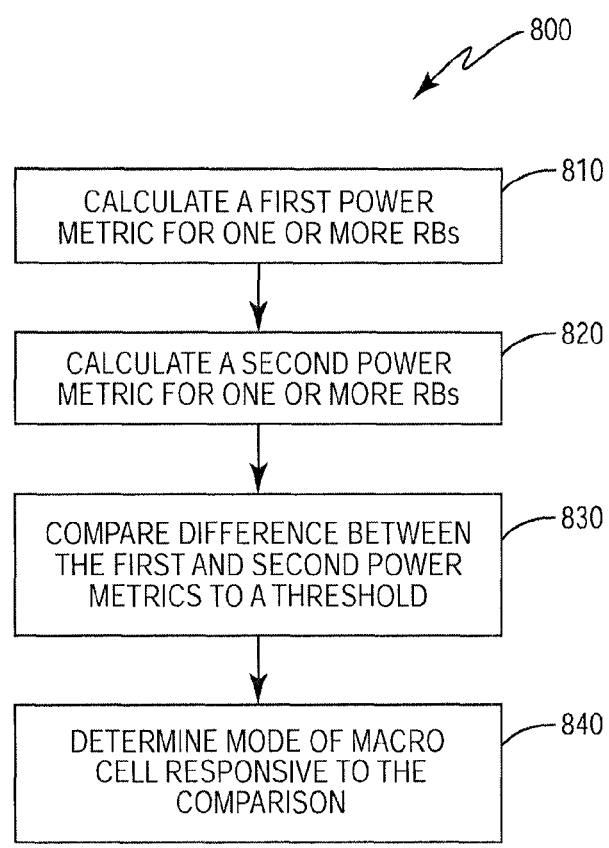
FIG. 8 illustrates an example method for detecting an ABS configuration of a macro cell.

FIG. 8 illustrates an example method 800 for detecting an ABS configuration for an interfering macro cell in a heterogeneous network (e.g. the macro cell 110 in the heterogeneous network 100). The method 800 is implemented in the wireless terminal 900 of FIG. 11. For one or more resource blocks in a received signal, the wireless terminal 900 calculates (step 810) a first power metric as a function of channel response estimates determined for predicted CRS RE locations in a plurality of symbols (e.g. OFDM symbols). For the one or more resource blocks in the received signal, the wireless terminal 900 also calculates (step 820) a second power metric as a function of channel response estimates determined for the predicted CRS RE locations in a single one of the plurality of symbols.

A difference between the first and second power metrics is compared (step 830) to a threshold, and responsive to the comparison a determination is made (step 840) as to whether the macro cell is operating in a MBSFN mode or a non-MBSFN mode. In one example, the MBSFN mode corresponds to the difference being greater than or equal to the threshold, and the non-MBSFN mode corresponds to the difference being less than the threshold.

Although only a single ABS is illustrated in each of FIGS. 6a-d (each including a single resource block) and only a single low-power cell subframe 510 is illustrated in FIGS. 6a-b (also each including a single resource block), it is understood that multiple resource blocks could be analyzed. Thus, in one example, the steps of calculating a first power metric (step 810), calculating a second power metric (step 820), and comparing a difference between the first and second power metrics to a threshold (step 830) are performed for a plurality of resource blocks. In this example, the determining of whether the macro cell is operating in a MBSFN mode or a non-MBSFN mode (step 840) is performed responsive to the plurality of comparisons, with the MBSFN mode corresponding to a majority of the differences being greater than or equal to the threshold, and the non-MBSFN mode corresponding to a majority of the differences being less than the threshold.

Figure 9:
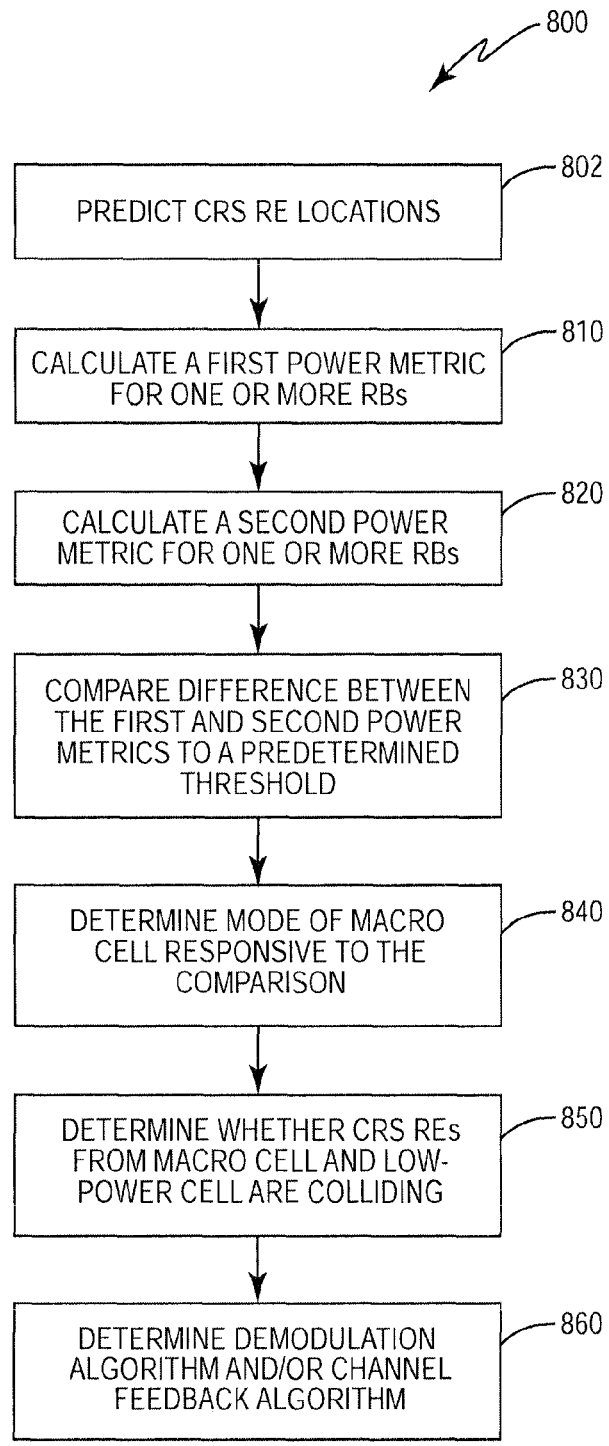
FIG. 9 illustrates the method of FIG. 8 with additional processing steps.

FIG. 9 illustrates the method 800 of FIG. 8 with additional processing steps. In a first step, CRS RE locations are predicted (step 802) for the received ABS and the low-power cell subframe 510, responsive to a cell identifier (ID) received from each of the macro cell 110 and the low-power cell 120. Step 802 includes predicting the CRS RE locations for the plurality of symbols of step 810 (e.g. the first, fifth, eighth and twelfth OFDM symbols) and the single one of the plurality of symbols of step 820 (e.g. the first OFDM symbol of the ABS).

For one or more resource blocks in a received signal, a first power metric is calculated (step 810) as a function of channel response estimates determined for predicted CRS RE locations in a plurality of symbols. The first power metric is calculated under the hypothesis that the interfering macro cell 110 is operating in the non-MBSFN mode (in which case CRS REs are included in a plurality of OFDM symbols of the ABS).

The first power metric may correspond to a reference signal received power (RSRP) for the CRS. In one example, the RSRP may be calculated differently for the control region (region 520), and the data region (region 530). The control region RSRP (CR-RSRP) may be defined as the linear average over the power contributions (in Watts) of the CRS REs within the considered measurement frequency bandwidth in the OFDM symbols used for PDCCH/PCFICH/PHICH allocation (i.e. the control region 520). The data region RSRP (DR-RSRP) may be defined as the linear average over the power contributions (in Watts) of the CRS REs within the considered measurement frequency bandwidth in the OFDM symbols used for PDSCH allocation (i.e. the data region 530).

Step 810 may be implemented using equation #1 shown below:

$$P_0^{(p)} = \frac{1}{N_{RB}} \sum_{RB=0}^{N_{RB}-1} |\bar{h}_{0,RB}^{(p)}|^2 \qquad \text{equation \#1}$$

In equation #1, p refers to a CRS port number, and K corresponds to the quantity of CRS REs for each port p in an $l^{th}$ OFDM symbol within a given resource block. Thus, for example, if one port is being used, then for each OFDM symbol including a CRS RE, four REs are included for the single port, so K=2 (see, e.g., FIG. 5a). Similarly, if two ports are being used, then for each OFDM symbol including a CRS RE, two REs are included for each port, so the value of K=2 (see, e.g., FIG. 5b).

The variable $N_{RB}$ corresponds to the number of resource blocks being considered. Thus, $N_{RB}$ effectively defines the frequency bandwidth being analysed by the wireless terminal 900 in performing method 800. As discussed above, while it is possible that a single received resource block may be analysed (see, e.g., the single resource block pictured in each of FIGS. 5a-b and FIGS. 6a-d), it is understood that the method 800 is not limited to only covering one resource block, and that multiple simultaneously-received, or subsequently-received resource blocks could be considered. In one example, $N_{RB}$=50, indicating that 50 received resource blocks are being analysed, which may correspond to a 10 MHz measurement frequency bandwidth.

The $\bar{h}_{0,RB}^{(p)}$ of equation #1 is the average channel estimate for the $RB^{th}$ resource block, and may be computed as follows:

$$\bar{h}_{0,RB}^{(p)} = \frac{1}{KL_0} \sum_{k=0}^{K-1} \sum_{l \in \{0,4,7,11\}} \frac{r_{l,k,RB}^{(p)}}{v_{l,k,RB}^{(p)}} \qquad \text{equation \#2}$$

In this equation, $r_{l,k,RB}^{(p)}$ denotes the received complex value for the $l^{th}$ OFDM symbol of, and the $k^{th}$ CRS RE within an $RB^{th}$ resource block. The variable $v_{l,k,RB}^{(p)}$ is equal to the pilot value for the same RE.

The variable $L_0$ is equal to the number of symbols that contains CRS REs in the case of the non-MBSFN ABS (e.g. $L_0$=4 to account for the first, fifth, eighth, and twelfth symbols of ABS 610). If the wireless terminal 900 knows the quantity, $N_{CRS}$, of CRS ports being utilized by the low-power cell 120 from the physical broadcasting channel (PBCH), the power can be averaged as shown below:

$$P_0 = \frac{1}{N_{CRS}} \sum_{p=0}^{N_{CRS}-1} P_0^{(p)} \qquad \text{equation \#3}$$

Alternatively, if the quantity of CRS ports is not known, the equation #4 (shown below) may be used to determine power. In order to obtain $P_0$ in Watts, it may be necessary to perform scaling with an appropriate factor.

$$P_0 = P_0^{(0)} \qquad \text{equation \#4}$$

Referring again to FIG. 9, for the one or more resource blocks in the received signal, a second power metric is calculated (step 820) as a function of channel response estimates determined for the predicted CRS RE locations in a single one of the plurality of symbols. Thus, the second power metric is calculated under the hypothesis that the macro cell 110 is operating in the MBSFN mode (in which case CRS REs are included only in a single OFDM symbol of the ABS). Step 820 may be implemented using equations #5-6 shown below:

$$P_1^{(p)} = \frac{1}{N_{RB}} \sum_{RB=0}^{N_{RB}-1} |\bar{h}_{1,RB}^{(p)}|^2 \qquad \text{equation \#5}$$

$$\bar{h}_{1,RB}^{(p)} = \frac{1}{KL_1} \sum_{k=0}^{K-1} \sum_{l \in [0]} \frac{r_{l,k,RB}^{(p)}}{v_{l,k,RB}^{(p)}} \qquad \text{equation \#6}$$

In these equations, $L_1=1$ corresponds to the number of OFDM symbols that contains CRS REs in the MBSFN subframe case (see, e.g., ABS 620 and ABS 640). If number of CRS ports are known, one may use equation #7, and if not one may use equation #8, both shown below.

$$P_1 = \frac{1}{N_{CRS}} \sum_{p=0}^{N_{CRS}-1} P_1^{(p)} \qquad \text{equation \#7}$$

$$P_1 = P_1^{(0)} \qquad \text{equation \#8}$$

Referring again to FIG. 9, a difference between the first and second power metrics is determined (see equation #9 below), and that difference is compared to a threshold $P_{thrd}$ (step 830).

$$\Delta P = P_1 - P_0 \qquad \text{equation \#9}$$

The threshold $P_{thrd}$ may be a power threshold, and in one or more embodiments may be predetermined. Of course, it is also possible that the threshold may be dynamically determined. Responsive to the comparison of step 830, a determination is made (step 840) as to whether the macro cell 110 is operating in the MBSFN mode or the non-MBSFN mode. In one example, the MBSFN mode corresponds to the difference being greater than or equal to the threshold (i.e., $\Delta P \geq P_{thrd}$), and the non-MBSFN mode corresponds to the difference being less than the threshold (i.e., $\Delta P < P_{thrd}$).

A determination may then be made (step 850) as to whether CRS REs from the macro cell 100 and the low-power cell 120 within the macro cell 110, are colliding or non-colliding responsive to a cell identifier (ID) received from each of the macro cell 110 and the low-power cell 120.

Figure 10:
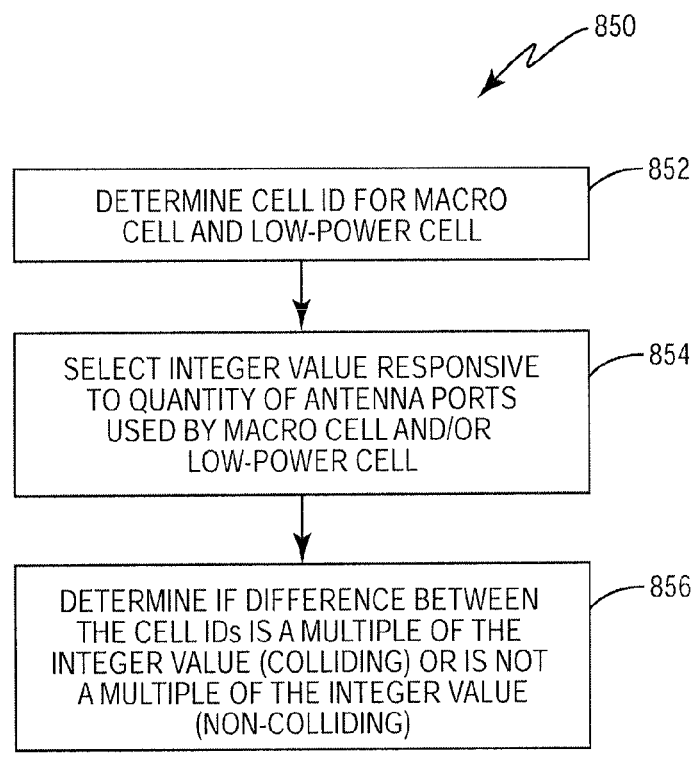
FIG. 10 illustrates an example implementation of a collision detection feature of the method of FIG. 9.

FIG. 10 illustrates an example implementation of step 850 in greater detail. In the example of FIG. 10, step 850 includes determining a cell ID (step 852) for each of the macro cell 110 and the low-power cell 120. These cell IDs may be labeled cell_id$_0$ and cell_id$_1$ respectively. Step 852 may be performed via a cell search performed over a primary synchronization signal (PSS), a secondary synchronization signal (SSS), or both, for example.

An integer value is selected (step 854) responsive to the quantity of antenna ports used by the macro cell 110, the low-power cell 120, or both (e.g. "6" in a one port setup, or "3" in a two or more port setup). Then, a determination is made (step 856) as to whether the difference between the cell IDs is a multiple of the integer value, or is not a multiple of the integer value. In one example, if the difference is a multiple of the integer value then the CRS REs of the ABS and subframe 510 are determined to be colliding, and if the difference is not a multiple of the integer value then the CRS REs of the ABS and subframe 510 are determined to not be colliding.

Step 856 may include use of the modulo operation. Thus, for example, if mod (cell_id$_1$-cell_id$_0$, 6)=0 in one port setup or mod (cell_id$_1$-cell_id$_0$, 3)=0 in two or more CRS port setup, the CRS REs are colliding, and if neither one of these expression equals zero then the CRS REs are as non-colliding.

Returning now to FIG. 9, once steps 840 and 850 have been performed, another determination is made (step 860) of at least one of a demodulation algorithm or a channel feedback algorithm for the wireless terminal 900 responsive to the determination of whether the macro cell 110 is operating in the MBSFN mode or the non-MBSFN mode (step 840), and the determination of whether the CRS REs of the ABS and the low-power cell subframe are colliding or non-colliding (step 850).

The determined demodulation algorithm may include an advanced receiving algorithm, such as PDSCH demodulation or PDCCH demodulation. The determined channel feedback algorithm may be a CQI/PMI/RI measurement algorithm. Some example algorithm selection criteria are summarized in the Table 1 below. In Table 1, the phrase "aggressive cell" refers to the interfering macro cell 110, and the phrase "polluted REs" refers to the CRS REs of the control region 520 of subframe 510 which are experiencing collisions.

TABLE 1

Advanced algorithms to be used following ABS detection

| ABS | CQI/PMI/RI calculation | PDSCH demodulation | PDCCH demodulation |
|---|---|---|---|
| ABS 610 | The impact of polluted REs from the aggressive cell should be involved to determine CQI/PMI/RI for link adaptation. | The interference on the polluted REs from the aggressive cell can be estimated and compensated. | The interference on the polluted REs from the aggressive cell can be estimated and compensated. |
| ABS 620 | The CQI/PMI/RI should be calculated from the CRS REs in the data channel region 530. | The channel used to assist demodulation should be estimated from the CRS REs in the data channel region 530. | The interference on the polluted REs from the aggressive cell can be estimated and compensated. |
| ABS 630 | The interference offset between CRS and PDSCH REs should be involved to determine the CQI/PMI/RI. | The interference to CRS REs from the aggressive cell can be estimated and cancelled. | The interference to CRS REs from the aggressive cell can be estimated and cancelled. |
| ABS 640 | The CQI/PMI/RI should be calculated from the CRS REs in the data channel region 530. | The channel used to assist demodulation should be estimated from the CRS REs in the data channel region 530. | The channel used to assist demodulation should be estimated from the CRS REs in the control channel region 520. |

Figure 11:
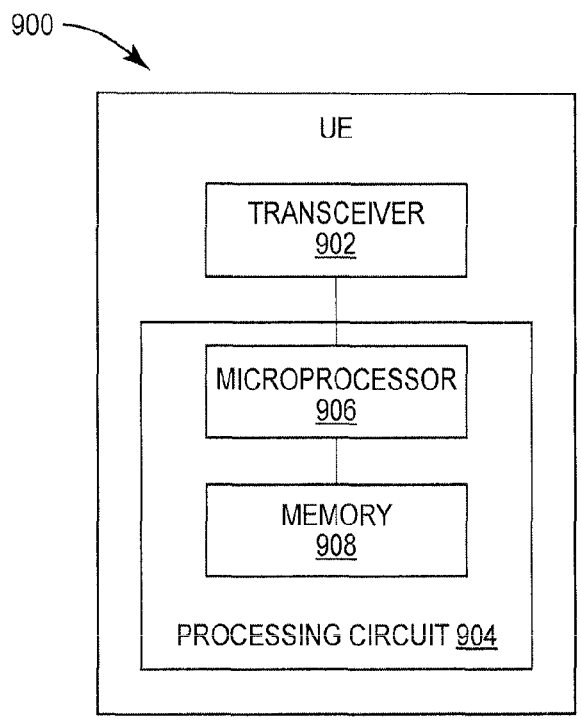
FIG. 11 illustrates an example a wireless terminal operative to implement the methods of FIGS. 8-10.

FIG. 11 illustrates an example wireless terminal 900 configured to carry out the methods of FIGS. 8-1 in a heterogeneous network. Of course, not every detail of the wireless terminal 900 design is shown, but instead a few of the components relevant to the present techniques are pictured. The pictured wireless terminal 900 includes a transceiver circuit 902 and a processing circuit 904. The transceiver circuit 902 includes one or more receiver circuits and transmitter circuits that use known radio processing and signal processing components and techniques, typically according to a particular telecommunications standard such as the 3GPP standard for LTE and/or LTE-Advanced. Because the various details and engineering tradeoffs associated with the design and implementation of such circuitry are well known and are unnecessary to a full understanding of the invention, additional details of the transceiver circuit 902 are not shown here.

The processing circuit 904 includes a processor 906 configured to implement the methods of FIGS. 8-10 by for example executing program code stored in memory 908. The processor 906 may include, for example, a combination of one or more microprocessors or microcontrollers, digital signal processors (DSPs), special-purpose digital logic, and the like. The memory 908 may include one or several types of memory such as read-only memory (ROM), random-access memory, cache memory, flash memory devices, optical storage devices, etc. The memory 908 includes program instructions for executing one or more telecommunications and/or data communications protocols, as well as instructions for carrying out one or more of the methods described above.

Figure 12:
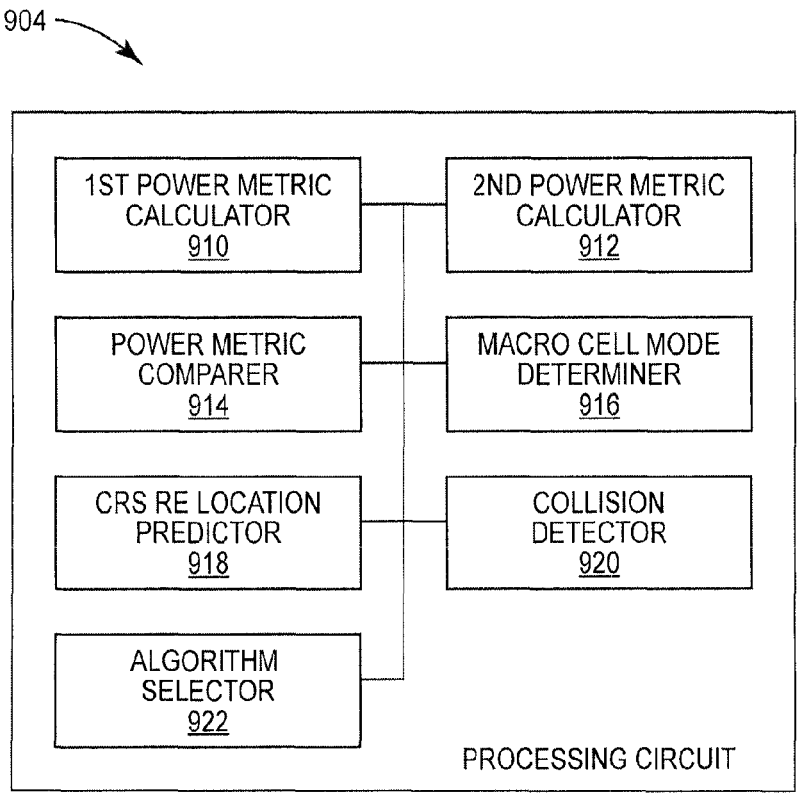
FIG. 12 illustrates a processing circuit of the wireless terminal of FIG. 11.

FIG. 12 illustrates the processing circuit 904 of the wireless terminal 900 of FIG. 10 in greater detail. As shown in FIG. 12, the processing circuit 904 may include a first power metric calculator 910 (for performing step 810), a second power metric calculator 912 (for performing step 820), a power metric comparer 914 (for performing step 830), and a macro cell mode determiner 916 (for performing step 840). The processing circuit 904 may also include a CRS RE location predictor 918 (for performing step 802), a collision detector 920 (for performing step 850), and an algorithm selector 922 (for performing step 860). The various modules 910-922 of the processing circuit may correspond to separate circuits, or may correspond to a single circuit (e.g. a microprocessor), for example. Of course, it will be appreciated that not all of the steps 802-860 are necessarily performed in a single microprocessor or a single module.

Advantageously the methods of FIGS. 8-10 may be used to implement a blind ABS detection to assist in algorithm selection. By measuring the difference between control region 520 RSRP and data region 530 RSRP, the wireless terminal 900 can detect an ABS configuration of the interfering macro cell 110, and can use that detected configuration along with a detection of whether the CRS REs are colliding or non-colliding, in selecting a demodulation or channel feedback algorithm. Also, the difference between the powers of CRS REs in data region 530 and control region 520 may be calculated as the residual interference to assist CQI compensation.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

The invention claimed is:

1. A method for detecting an Almost-Blank Subframe (ABS) configuration for an interfering macro cell of a heterogeneous network, the method being implemented in a wireless terminal and comprising:
   for one or more resource blocks in a received signal that is received from a cell in the heterogeneous network that is not the interfering macro cell, calculating a first power metric as a function of channel response estimates determined for predicted common reference signal (CRS) resource element locations in a plurality of symbols;
   for the one or more resource blocks in the received signal, calculating a second power metric as a function of channel response estimates determined for the predicted CRS resource element locations in a single one of the plurality of symbols;
   comparing a difference between the first and second power metrics to a threshold; and
   determining whether the interfering macro cell is operating in a Multicast and Broadcast Single Frequency Network (MBSFN) mode or a non-MBSFN mode based on the comparison, wherein the MBSFN mode corresponds to the difference being greater than or equal to the threshold, and the non-MBSFN mode corresponds to the difference being less than the threshold.

2. The method of claim 1:
   wherein calculating a first power metric, calculating a second power metric, and comparing a difference between the first and second power metrics to a threshold are performed for a plurality of resource blocks; and
   wherein determining whether the interfering macro cell is operating in a MBSFN mode or a non-MBSFN mode is performed based on the plurality of comparisons, with the MBSFN mode corresponding to a majority of the differences being greater than or equal to the threshold, and the non-MBSFN mode corresponds to a majority of differences being less than the threshold.

3. The method of claim 1, wherein the plurality of symbols corresponds to the first, fifth, eighth and twelfth symbols of the one or more resource blocks, and wherein the single one of the plurality of symbols corresponds to the first symbol of the one or more resource blocks.

4. The method of claim 1, further comprising predicting the CRS resource element locations for the plurality of symbols and the single one of the plurality of symbols based on a cell identifier (ID) received from each of the interfering macro cell, and a low-power cell supporting the wireless terminal.

5. The method of claim 1, wherein the cell in the heterogeneous network that is not the interfering macro cell is a low-power cell, the method further comprising determining whether CRS resource elements from the interfering macro cell and the low-power cell within the macro cell are colliding or non-colliding based on a cell identifier (ID) received from each of the macro cell and a low-power cell.

6. The method of claim 5, further comprising determining at least one of a demodulation algorithm or a channel feedback algorithm for the wireless terminal based on the determination of whether the interfering macro cell is operating in the MBSFN mode or the non-MBSFN mode, and the determination of whether the CRS resource elements are colliding or non-colliding.

7. The method of claim 5, wherein the determining whether CRS resource elements from the interfering macro cell and the low-power cell within the macro cell are colliding or non-colliding based on a cell ID received from each of the interfering macro cell and the low-power cell comprises:

performing a cell search to determine the cell ID for each of the macro cell and the low-power cell; and determining if a difference between the cell IDs is a multiple of a integer value, wherein the CRS resource elements being colliding corresponds to the difference being a multiple of the integer value, and wherein the CRS resource elements being non-colliding corresponds to the difference between the cell IDs not being a multiple of the integer value.

8. The method of claim 7, further comprising:

selecting the integer value based on a quantity of antenna ports being utilized by the macro cell, the low-power cell, or both.

9. The method of claim 7, wherein the cell search is performed over a primary synchronization signal (PSS), a secondary synchronization signal (SSS), or both.

10. A wireless terminal for use in a heterogeneous wireless communication network, the wireless terminal comprising:

a one or more transceivers operative to transmit messages to and receive messages from an interfering macro cell and a low-power cell in the heterogeneous wireless communication network; and a processing circuit operatively associated with the one or more transceivers, and configured as:

a first power metric calculator configured to calculate, for one or more resource blocks in a received signal that is received from the low-power cell, a first power metric as a function of channel response estimates determined for predicted common reference signal (CRS) resource element locations in a plurality of symbols;

a second power metric calculator configured to calculate, for the one or more resource blocks in the received signal, a second power metric as a function of channel response estimates determined for the predicted CRS resource element locations in a single one of the plurality of symbols;

a power metric comparer configured to compare a difference between the first and second power metrics to a threshold; and a macro cell mode determiner configured to determine whether the interfering macro cell is operating in a Multicast and Broadcast Single Frequency Network (MBSFN) mode or a non-MBSFN mode based on the comparison, wherein the MBSFN mode corresponds to the difference being greater than or equal to the threshold, and the non-MBSFN mode corresponds to the difference being less than the threshold.

11. The wireless terminal of claim 10, wherein the power metric comparer is configured to compare differences between the first and second power metrics of a plurality of resource blocks, and wherein the MBSFN mode corresponds to a majority of the differences being greater than or equal to the threshold, and the non-MBSFN mode corresponds to a majority of differences being less than the threshold.

12. The wireless terminal of claim 10, wherein the plurality of symbols corresponds to the first, fifth, eighth and twelfth symbols of the one or more resource blocks, and wherein the single one of the plurality of symbols corresponds to the first symbol of the one or more resource blocks.

13. The wireless terminal of claim 10, wherein the processing circuit is further configured as a CRS resource element location predictor configured to predict the CRS resource element locations for the plurality of symbols and the single one of the plurality of symbols based on a cell identifier (ID) received from each of the macro cell and the low-power cell.

14. The wireless terminal of claim 10, wherein the processing circuit is further configured as a collision detector configured to determine whether CRS resource elements from the macro cell and the low-power cell within the macro cell are colliding or non-colliding based on a cell identifier (ID) received from each of the macro cell and the low-power cell.

15. The wireless terminal of claim 14, wherein the processing circuit is further configured as an algorithm selector configured to determine at least one of a demodulation algorithm or a channel feedback algorithm for use in processing the received signal based on the determined macro cell mode and the determination of whether the CRS resource elements are colliding or non-colliding.

16. The wireless terminal of claim 14, wherein to determine whether the CRS resource elements from the macro cell and the low-power cell within the macro cell are colliding or non-colliding based on a cell ID received from each of the macro cell and the low-power cell, the collision detector is configured to:

perform a cell search to determine the cell ID for each of the macro cell and the low-power cell; and determine if a difference between the cell IDs is a multiple of a integer value, wherein the CRS resource elements being colliding corresponds to the difference being a multiple of the integer value, and wherein the CRS resource elements being non-colliding corresponds to the difference between the cell IDs not being a multiple of the integer value.

* * * * *

UNITED STATES PATENT AND TRADEMARK OFFICE
CERTIFICATE OF CORRECTION

| | | Page 1 of 1 |
|---|---|---|
| PATENT NO. | : 9,179,396 B2 | |
| APPLICATION NO. | : 13/384440 | |
| DATED | : November 3, 2015 | |
| INVENTOR(S) | : Wang et al. | |

It is certified that error appears in the above-identified patent and that said Letters Patent is hereby corrected as shown below:

In the Specification
In Column 11, Line 39, delete "macro cell 100" and insert -- macro cell 110 --, therefor.

Signed and Sealed this
Twenty-ninth Day of March, 2016

Michelle K. Lee
*Director of the United States Patent and Trademark Office*